Figure 1:
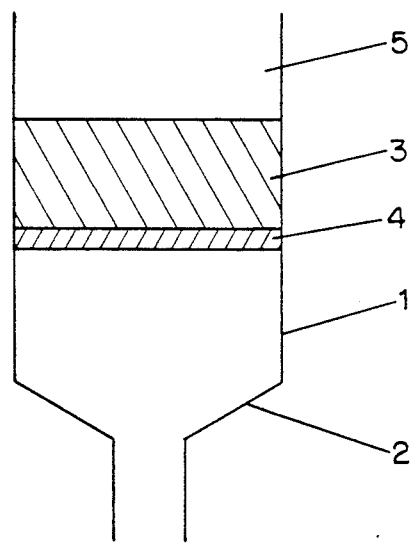

United States Patent [19]

Sachse et al.

[11] Patent Number: 5,178,778
[45] Date of Patent: Jan. 12, 1993

[54] APPARATUS AND METHOD FOR SEPARATING IMMISCIBLE LIQUID MIXTURES

[75] Inventors: Helmut Sachse, Freising; Konrad Schembra, Ingolstadt; Horst Fleischmann, Burghausen; Rudolf Griesshammer, Altötting, all of Fed. Rep. of Germany

[73] Assignee: Chemische Fabrik Feising GmbH, Freising, Fed. Rep. of Germany

[21] Appl. No.: 809,675

[22] Filed: Dec. 18, 1991

[30] Foreign Application Priority Data

Dec. 27, 1990 [DE] Fed. Rep. of Germany ....... 4041903

[51] Int. Cl.5 ............................................. B01D 17/02
[52] U.S. Cl. .................................. 210/799; 210/767; 210/500.1; 210/496
[58] Field of Search ............... 210/767, 807, 799, 295, 210/679, 680, 284, 290, 500.1, 660, 644, 500.29, 496

[56] References Cited

U.S. PATENT DOCUMENTS

| | | |
|---|---|---|
| 1,927,875 | 9/1933 | McKean .............................. 210/496 |
| 2,588,794 | 3/1952 | Barton ................................ 210/799 |
| 2,834,730 | 5/1958 | Painter et al. ...................... 210/496 |
| 3,334,042 | 8/1967 | Teitsma ............................... 210/496 |
| 3,681,237 | 8/1972 | Orban et al. ....................... 210/680 |
| 3,689,406 | 9/1972 | Ohta et al. .......................... 210/799 |
| 3,779,908 | 12/1973 | Gregory ............................. 210/799 |
| 3,905,954 | 9/1975 | Jones et al. ....................... 210/500.1 |
| 4,274,960 | 6/1981 | Abrahamsson .................... 210/496 |

Primary Examiner—Robert A. Dawson
Assistant Examiner—Ana M. Fortuna
Attorney, Agent, or Firm—Brumbaugh, Graves, Donohue & Raymond

[57] ABSTRACT

A device for separating mixtures of liquids not miscible with one another, especially of oil/water mixtures and with a filter medium of a viscose sponge layer which is capable of taking up oil and water is provided. The device is characterized in that, in the direction of flow of the liquid mixture to be separated after at least one viscose sponge layer (3), there is arranged at least one oil repellent viscose cloth (4). The device has the advantage that is allows in simple and certain fashion the separation of oil/water mixtures and an environmentally friendly disposal of the separated oil.

8 Claims, 1 Drawing Sheet

APPARATUS AND METHOD FOR SEPARATING IMMISCIBLE LIQUID MIXTURES

The invention relates to a device for separating mixtures of liquids not miscible with one another, particularly of oil/water mixtures, with a filter medium of a viscose sponge layer capable of receiving oil and water.

The disposal of mixtures of oil and water presents substantial problems. This is, for example, the case for oil/water mixtures which arise in connection with the maintenance of lorries, in workshops and filling stations. These mixtures should not, on the one hand, be introduced into the public waste water system, but, on the other hand, however, they cannot be disposed of by incineration because they are very difficult to burn. Also such liquid mixtures arise if, because of seal failure of storage tanks or in the case of accidents, oil is released into natural waters or comes into the groundwater.

It has already been attempted to separate away the oil from the noted mixtures in order then to be able to combust it in customary fashion. One means for carrying out such a process is a viscose sponge known as such through which the oil/water admixture is passed. With respect to this sponge, this is a material from regenerated cellulose which is traversed by open pores and reinforced by fibres. For manufacturing the sponge, for example from wood or cotton, first cellulose is obtained. This is treated in series subsequently with sodium carbonate, carbon disulphide and sodium hydroxide and then treated with the strengthening fibres such as cotton, ramie, flax, sisal or hemp fibres at a length of from about 1 to 10 mm or more. After the addition of sodium sulphate crystals, the mixture is coagulated and these crystals are then dissolved out, whereby the desired pores of the viscose sponge are formed.

Such a viscose sponge has the disadvantage as a filter medium for oil/water admixtures that it retains the oil only insufficiently. This leads to the fact that after a certain startup phase of good separation of oil and water, the oil "breaks through" the viscose sponge layer and accordingly no separation from the water takes place any longer. In order to prevent this, the viscose sponge layer must be renewed in good time. It is, however, very difficult with differing proportions of oil in the oil/water mixture in each case to predict when such an oil breakthrough is to be expected. In each case accordingly on the grounds of safety, the oil takeup ability of the viscose sponge layer is not used up to a substantial degree.

As well as this, viscose cloths are also known which likewise are of a material made from cellulose. It consists essentially, for example, of a pressed mixture of crude cotton fibres and regenerated cellulose. The latter is present, for example, in an amount of 72%. Also such viscose cloths are customary in commerce.

The object underlying the invention is to provide a device with the aid of which mixtures of liquids not miscible with one another, particularly oil/water mixtures, can be separated in a simple and sure fashion. In the case of oil/water mixes, the device should provide that the oil can be disposed of as completely as possible and in an environmentally friendly fashion.

The invention solves this problem by a device of the initially described type which is characterised in that, in the direction of flow of the liquid mixture to be separated, after at least one viscose sponge layer at least one oil repellent viscose cloth is arranged.

The device in accordance with the invention has the advantage that, by means of a simple filter process, an oil/water admixture can be separated into its two components. For this, one lets the liquid mixture to be treated pass through an arrangement of the viscose sponge and the subsequently arranged viscose cloth. This preferably takes place without special energy requirements with the aid of gravity, i.e. in a direction of flow from above to below. However, if needed, the separating process can also be accelerated by the application of an excess pressure on the side of the feed of the liquid mixture to the viscose sponge or by corresponding formation of a reduced pressure on the side of the viscose cloth of the separating process, wherein then the direction of flow can also vary from the direction of gravity. During the flow of the liquid mixture through the device, the oil is held back by the viscose sponge layer and the viscose cloth while the water passes through both.

Then the oil together with the viscose sponge layer and the viscose cloth can be disposed of by clean combustion and the water can be fed without danger to the environment to the public waste water system. Environmental stress by oil or oil/water admixtures can accordingly be avoided.

A particular advantage of the device in accordance with the invention lies in the certainty that the takeup ability of the viscose sponge can be used to the maximum without the risk arising that the oil which collects in the viscose sponge layer should break through the viscose sponge layer and the oil free water obtained as a filtrate would be contaminated again. Since the viscose cloth is oil repellent, it not only prevents an undesired passage of the oil, but also because of its collection on the side of the viscose cloth turned toward the viscose sponge, it becomes impermeable for the water to an increasing degree. The result is a reduced amount of water going through the viscose cloth, whereby it can then easily be detected that the oil takeup ability of the device in accordance with the invention is reached and the combination of the viscose sponge layer and the viscose cloth must be replaced by a fresh combination. The diminution of the quantity of water passing through the viscose cloth can, in this connection, be sensed in customary fashion using measurement techniques and give out a signal. The other way round, the using up of the viscose sponge layer can also be detected by the slowing down or no longer present sinking of the liquid level on the inlet side of the device.

According to a preferred embodiment of the device in accordance with the invention, the thickness of the viscose sponge layer in the direction of flow of the liquid mixture to be separated amounts to at least 25 times, preferably 40 to 50 times, the thickness of the viscose cloth. Maintaining this condition ensures that during the separating process, the oil/water mixture remains within the viscose sponge layer and is pre-separated to a sufficient degree. This means that the water in the viscose sponge layer streams out before the slower flowing oil and passes through the viscose cloth before the oil reaches it.

Leaving out the viscose cloth would lead only to the case that in the course of the separating process, the oil would break through the viscose sponge layer and the previously separated water would be contaminated again but it would also prevent the detection in good time of the using up of the viscose sponge layer It is also particularly expedient to develop the device in accordance with the invention in a manner that in the direction of flow of the liquid mixture to be separated, after the viscose cloth there is arranged at least one further viscose sponge layer and at least one further viscose cloth. This increases the safety of separating the various liquid components and the safety against breaking through by the originally retained liquid components from a too long use of the decive. The viscose sponge layers and viscose cloths can inter alia differ from one another in different layer thicknesses, porosities and/or colors.

It also proved particularly favorable that at least one viscose sponge layer is an indicator layer indicating the entering of one of the liquids to be separated into said layer. This entails the advantage that it can be detected immediately when the front of the liquid component to be separated, in its flow direction has reached a specific point of the device and, if necessary, the arrangement of viscose sponge layer(s) and viscose cloth(s) is to be replaced as being used up. For instance by changing its color, the indicator layer can indicate the arrival of the desired liquid component.

The invention will be explained with reference to the exemplary embodiments which are schematically shown in the drawing.

There is shown in

Figure 2:
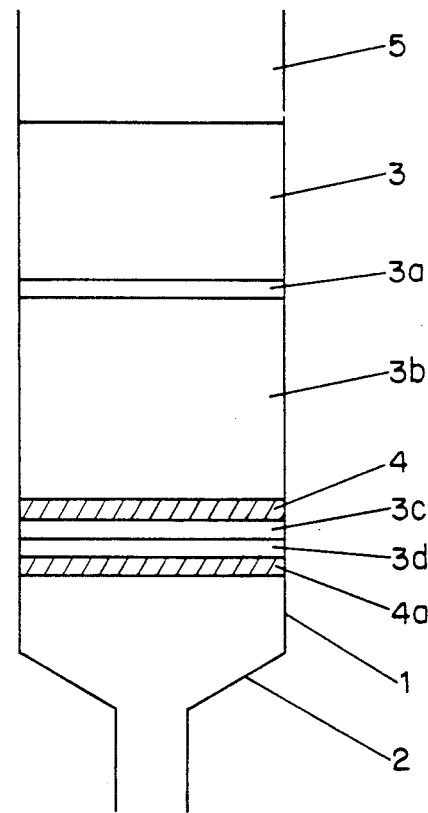

FIG. 1 a first embodiment of the device with a viscose sponge layer and a viscose cloth; and FIG. 2 a second embodiment of the device with five viscose sponge layers and two viscose cloths.

The use of the invention in practice is described below by examples 1 and 2.

EXAMPLE 1

In FIG. 1, a device for separating an oil/water mixture is schematically illustrated. The device consists essentially of a vertically arranged cylindrical housing section 1 and thereunder connected thereto a downwardly narrowing funnel shaped housing section 2. In the cylindrical housing section 1, there extends across the entire interior cross section a viscose sponge layer 3 which is covered on its underside across its entire surface by viscose cloth 4.

The viscose sponge layer 3 consists essentially of regenerated cellulose which is reinforced with cotton and hemp fibres. The viscose cloth 4 is a pressed material of essentially regenerated cellulose and raw cotton fibres, wherein the proportion of regenerated cellulose amounts to around 70 wt. %. Both the viscose sponge and also the viscose cloth are obtainable in commerce with difference porosities, e.g. from Messrs. Spontex, 3M Company, Hoechst AG and Enka AG. The respective product designations are e.g. "Spontex Typ 2246" and "Kalletuch". The sponge is oil-adsorbing.

The diameter of the viscose sponge layer 3 agreeing with the inner diameter of the cylindrical housing section 1 amounts to 200 mm and the thickness of this layer 3 lies at 100 mm. The diameter of the viscose cloth 4 amounts likewise to 200 mm and its thickness 2 mm. The weight of the viscose sponge layer 3 amounts to 40 g.

Before loading the device with an oil/water mixture, via its filling opening 5, so much water is added that the viscose sponge layer 3 and the viscose cloth 4 thereof are entirely saturated. Then the device is loaded with 200 g of a mixture of 100 g old lorry oil and 100 g water. The weight of the oil in this mixture amounts to 2.5 times the weight of the viscose sponge layer 3.

After a passage time of ca. 80 min, the oil/water mixture is separated. The oil is retained in the viscose sponge layer 3 while the water passes through this layer 3 and the viscose cloth 4. The water is practically free of oil and can be fed to the public waste water system. Only a few grease spots were evident on the water surface.

Towards the end of the separating process, a slowing down of the water stream emerging from the viscose cloth 4 is observed. However, no oil breaks through the viscose cloth.

After ending the separating process, the old oil is disposed of in that it is combusted together with the combination of the viscose sponge layer 3 and the viscose cloth 4.

EXAMPLE 2

The test according to Example 1 is repeated with a device according to FIG. 2. The reference numerals indicated in FIG. 2 have the same meanings as the corresponding reference numerals of FIG. 2.

However, the device according to FIG. 2 in flow direction of the liquid mixture to be separated after the first viscose sponge layer 3, is equipped, in series, with a relatively thin second viscose sponge layer 3a (first indicator layer), a relatively thick third viscose sponge layer 3b, a first viscose cloth 4, a relatively thin fourth viscose sponge layer 3c (safety area), a relatively thin fifth viscose sponge layer 3d (second indicator layer) and with a second viscose cloth 4a. The viscose sponge layers 3a, 3d which serve as first and second indicator layers clearly change their colors when being impregnated with waste oil of motor vehicles.

The separation achieved in the liquid mixture by means of the device according to FIG. 2 is also favorable.

We claim:

1. An apparatus for separating immiscible liquid mixtures, particularly oil and water mixtures comprising:
   a housing,
   at least one viscose sponge layer capable of taking up oil and water extending across the cross section of said housing, wherein said sponge layer has an upperside and an underside and said liquid mixture flows through said sponge from said upperside to said underside, and
   at least one oil repellant viscose cloth having an upperside and an underside wherein the upperside of said cloth covers the entire surface of the underside of said sponge layer, said viscose sponge layer being at least 25 times as thick as said viscose cloth.

2. An apparatus according to claim 1 wherein said sponge layer is 40 to 50 times as thick as said viscose cloth.

3. An apparatus according to claim 1 further comprising at least one additional viscose sponge layer having an upperside and an underside, wherein said upperside of said additional sponge layer covers the entire surface of the underside of said viscose cloth, and at least one additional viscose cloth having an upperside and underside, wherein said upperside of said additional cloth covers the entire surface of said underside of said additional viscose sponge layer.

4. An apparatus according to claim 3 wherein at least one viscose sponge layer indicates the entry into said layer of one of the liquids to be separated.

5. A method for separating an oil and water mixture comprising the steps of passing said mixture through at least one viscose sponge layer capable of taking up oil and water and subsequently passing said mixture through at least one oil repellent viscose cloth layer, wherein the viscose sponge layer is at least 25 times the thickness of the viscose cloth.

6. A method according to claim 5 wherein the viscose sponge layer is at least 40 to 50 times the thickness of the viscose cloth.

7. A method according to claim 6 further comprising the steps of passing said mixture through at least one additional viscose sponge layer followed by passing said mixture through at least one additional oil repellant viscose cloth layer.

8. A method according to claim 7 wherein at least one viscose sponge layer indicates the entry into said layer of one of the liquids to be separated.

* * * * *

UNITED STATES PATENT AND TRADEMARK OFFICE
CERTIFICATE OF CORRECTION

PATENT NO. : 5,178,778
DATED : January 12, 1993
INVENTOR(S) : Sachse et al.

It is certified that error appears in the above-identified patent and that said Letters Patent is hereby corrected as shown below:

Title page, Item 73, first line, "Feising" should read --Freising--.

Title page: 57 Abstract third-from-bottom line, "is" should read --it--.

Col. 3, line 11, "decive" should read --device--.

Col. 6, line 7, "repellant" should read --repellent--.

Signed and Sealed this

First Day of February, 1994

Attest:

BRUCE LEHMAN

Attesting Officer

Commissioner of Patents and Trademarks